Patented Oct. 7, 1947

2,428,738

UNITED STATES PATENT OFFICE 2,428,738

POLYALKYL AROMATIC INSECTICIDES

Robert R. Dreisbach and Fred W. Fletcher, Midland, Mich., assignors to The Dow Chemical Company, Midland, Mich., a corporation of Delaware No Drawing. Application January 1, 1942,
Serial No. 425,335

4 Claims. (Cl. 167—32)

The present invention is concerned with novel parasiticidal compositions and is particularly directed to insecticidal products comprising a polyalkylated aromatic product as an active toxicant.

It has been discovered that polyalkylated aromatic products substantially identical with those obtained by re-acting diethylbenzene with naphthalene in the presence of a Friedel-Crafts catalyst and having a boiling temperature above 230° C. at 25 millimeters pressure, are effective parasiticidal toxicants. Such products in mixture with inert diluents and carriers, or in combination with known parasiticides are effective as contact poisons against a number of insect and mite pests and are much more desirable in such use than either diethylbenzene or naphthalene alone.

The new toxicant materials may be employed in either spray or dust mixtures. In the preparation of spray compositions, the toxicant may be dispersed in water or other immiscible liquid carrier. Similarly, the toxicant may be dissolved in a light petroleum distillate such as kerosene to obtain compositions adapted to be employed as a household spray. In a further embodiment of the invention, the toxicant may be incorporated in heavy petroleum distillate and the solution thereafter emulsified with water to obtain emulsion compositions.

If desired, the polyalkylaromatic products may be compounded with such finely divided solid carriers as talc, gypsum, bentonite, diatomaceous earth, volcanic ash, pyrophyllite, ground derris root, or wood flour to obtain dust compositions which may be applied directly to parasite infested plants or dispersed in water to form spray compositions.

The amount of toxicant employed varies somewhat with the particular manner in which it is compounded for application, the nature of the parasite to be controlled, and, in the case of agricultural sprays or dusts, the tolerance of the host plant to be contacted therewith. In aqueous dispersions, the preferred amount of toxicant ranges from about 0.5 to 5 pounds per 100 gallons. For use as a household spray, the preferred toxicant concentration is from about 2 to about 20 per cent by weight in the petroleum distillate or other solvent employed as carrier. For use in dusts, from about 1 to about 5 per cent by weight of the toxicant is employed where the composition is to be applied directly as an agricultural parasiticide. Where the solid dispersion is to be used as a concentrate in the preparation of aqueous dispersions, from about 5 to about 60 per cent of the toxicant may be employed depending upon the absorptive properties of the particular carrier used in mixture therewith.

In spray compositions and in concentrates adapted to be employed in spray compositions, various wetting and dispersing agents may be employed in combination with the new toxicants. Representative of such products are soap, glyceryl oleate, partially neutralized sulphonated fish and vegetable oils, alkali metal salts of higher alkyl sulphonates, alkali metal salts of sulphonated phenols, aromatic hydrocarbons, esters, etc.

A particular advantageous feature of the new toxicants resides in their comparative stability whereby they may be employed in combination with many naturally occurring and synthetic parasiticidal materials. In such combinations, the polyalkylated aromatic product frequently serves as a solubilizing agent whereby the preparation of parasiticidal compositions comprising such toxicants as rotenone, organic thiocyanates, et cetera, is facilitated. Also the polyalkylated aromatic products may serve as solvents and carriers for other toxicants in the preparation of emulsions, et cetera. Toxicant materials which may be employed with the products of the present invention include rotenone containing plant materials such as derris, cube, barbasco, timbo, et cetera, pyrethrum extracts, nicotine sulphate, organic thiocyanates, alkyl-phenols, halo-phenols, alkyl, halo-alkyl, hydroxy-alkyl and thiocyano-alkyl ethers of phenols, lead arsenate, cryolite, et cetera.

Depending upon their particular physical form and toxic constituents compositions as set forth above may be employed for the control of such varied parasites as clothes moths, carpet beetles, housefly, mosquitoes, roaches, red spider, three-spotted mite, Colorado potato beetle, poplar aphis, pea aphis, corn-ear worm, white fly, et cetera. In addition the new toxicant materials have been found to exert a definite effect upon fungus and related growth.

The products adapted to be employed as toxicants in accordance with the teachings of the present invention are prepared by reacting diethylbenzene with naphthalene in the presence of a Friedel-Crafts catalyst such as aluminum chloride, zinc chloride, iron chloride, et cetera. From this reaction there are obtained ethylbenzene, diethylbenzene, ethyl and polyethyl naphthalenes, and high-boiling, unidentifiable, polyalkylated aromatic products boiling above 230° C. at 25 millimeters pressure and preferably between about 230° and 280° C. Various fractions of product falling within this boiling range have been found to have specific gravities at 25°/25° C. ranging between 1.00 and 1.05. These same fractions have refractive indices ranging between 1.60 and 1.63 $n_D^{25}$.

In a representative preparation 240 pounds of naphthalene, 180 pounds of diethyl benzene, and 8 pounds of finely divided aluminum chloride were mixed together and heated for ½ hour at 160°–170° C. with agitation. The crude reaction mixture was then washed with water and distilled to recover benzene, ethyl benzene, diethyl benzene, naphthalene, and identifiable ethyl- and polyethyl naphthalenes. The residue from this preliminary distillation amounted to approximately 53 pounds of a dark viscous product which was transferred to a smaller distillation vessel and fractionated under reduced pressure to separate tetra- and pentaethyl-naphthalenes. As high-boiling products from this distillation, there were obtained 3 fractions boiling above 230° C. at 25 millimeters pressure which were representative of those materials employed in accordance with the teaching of the present invention. The first of these was a viscous oil boiling at 232°–242° C. at 25 millimeters pressure. This product had a specific gravity of 1.037 at 25°/25° C. and a refractive index of 1.617 $n_D^{25}$. The second fraction boiled at 242°–251° C. at 25 millimeters pressure and had a specific gravity of 1.038 at 25°/25° C. and a refractive index of 1.620 $n_D^{25}$. The third fraction, boiling at 251°–277° C. at 25 millimeters pressure, had a specific gravity of 1.042 at 25°/25° C. and a refractive index of 1.613 $n_D^{25}$. All of these materials were thick viscous liquids, flowing with some difficulty at room temperature, and decomposing on attempted distillation at atmospheric pressure. The viscosity of the products increased with increase in boiling temperature. The color of the several fractions ranged from a dark red to a red-black.

The following examples are not to be construed as limiting:

*Example 1*

A portion of the fraction boiling at 232°–242° C. at 25 millimeters pressure as described above was mixed with an equal weight of sodium lauryl sulfate to produce a parasiticide concentrate. 4 pounds of this product was dispersed in 100 gallons of water to form a spray composition which gave a 95 per cent control of poplar aphis. At 6 pounds of the concentrate per 100 gallons of water the spray composition gave a control against Colorado potato beetle larvae of 81.4 per cent. Lead arsenate at 3 pounds per 100 gallons killed only 45 per cent of Colorado potato beetle larvae.

*Example 2*

The fraction boiling at 242°–251° C. at 25 millimeters pressure was similarly compounded with sodium lauryl sulfate to form a concentrate which at 2 pounds per 100 gallons of water gave a kill of 100 per cent against poplar aphis. When 6 pounds of this concentrate was dispersed in 100 gallons of water a composition was obtained which gave a kill against Colorado potato beetle of 86.3 per cent.

*Example 3*

In like manner, a portion of the fraction boiling at 251°–277° C. at 25 millimeters pressure was mixed with an equal weight of sodium lauryl sulfate. 1 pound of the resulting concentrate in 100 gallons of water gave a kill against poplar aphis of 99.7 per cent.

*Example 4*

10 parts by weight of a fraction boiling at 232°–277° C. at 25 millimeters pressure and obtained by the reaction of diethylbenzene with naphthalene is mixed with 90 parts by weight of plaster of Paris. Sufficient water is added to this mixture to give a product of plaster-like consistency. The mixture is then dried for 24 hours and thereafter ground to obtain a parasiticidal composition adapted to be dispersed in water to yield spray compositions valuable for control of red spider, Colorado potato beetle and other agricultural insect and mite pests.

*Example 5*

8.33 parts by weight of the fraction boiling between 242° and 251° C. at 25 millimeters pressure is dissolved in 100 parts of kerosene. This product may be employed either alone or in combination with pyrethrin extracts or rotenone for the control of houseflies, cockroaches, mosquitoes, etc.

*Example 6*

Walnut shell flour of 250–400 screen mesh particle size is ground with derris root to obtain a composition containing between about 0.5 and 1.0 per cent by weight of rotenone. This dust composition is wet with a toluene solution comprising sufficient of the fraction boiling at 232°–242° C. at 25 millimeters pressure to give a concentration of between 4 and 6 per cent by weight of the polyalkylated aromatic product in the dust mixture after evaporation of the toluene. The product so obtained may be employed either as a dust or dispersed in water to form a spray composition valuable for the control of pea aphis, red spider, and related parasites.

We claim:

1. An insecticidal composition comprising an inert carrier and a high-boiling fraction of the reaction product obtained by heating naphthalene and diethyl benzene with a Friedel-Crafts catalyst, said fraction boiling above 230° C. at 25 mm. pressure, having a specific gravity of 1.00 to 1.05 and a refractive index of 1.60 to 1.63, and said carrier being of the group consisting of powder, wetting agent, solvent, water, and mixtures thereof.

2. An insecticidal composition comprising a powdered inert carrier having incorporated therewith a high-boiling fraction of the reaction product obtained by heating naphthalene and diethyl benzene with a Friedel-Crafts catalyst, said fraction boiling above 230° C. at 25 mm. pressure, having a specific gravity of 1.00 to 1.05 and a refractive index of 1.60 to 1.63.

3. An insecticidal composition comprising a solution in a petroleum distillate of a high-boiling fraction of the reaction product obtained by heating naphthalene and diethyl benzene with a Friedel-Crafts catalyst, said fraction boiling above 230° C. at 25 mm. pressure, having a specific gravity of 1.00 to 1.05 and a refractive index of 1.60 to 1.63.

4. An insecticidal composition comprising a wetting agent and a high-boiling fraction of the reaction product obtained by heating naphthalene and diethyl benzene with a Friedel-Crafts catalyst, said fraction boiling above 230° C. at 25 mm. pressure, having a specific gravity of 1.00 to 1.05 and a refractive index of 1.60 to 1.63, said composition being adapted to be dispersed in water to form an aqueous spray.

ROBERT R. DREISBACH.
FRED W. FLETCHER.

REFERENCES CITED

The following references are of record in the file of this patent:

FOREIGN PATENTS

| Number | Country | Date |
|---|---|---|
| 321,187 | Great Britain | Nov. 1, 1929 |